United States Patent
Kirov et al.

(10) Patent No.: US 9,760,252 B1
(45) Date of Patent: Sep. 12, 2017

(54) CONTROLLING AND OPTIMIZING ACTIONS ON NOTIFICATIONS FOR A MOBILE DEVICE

(71) Applicant: Pebble Technology, Corp., Redwood City, CA (US)

(72) Inventors: Aleksandr Kirov, San Jose, CA (US); Henry Levak, San Mateo, CA (US); Melissa Sherman, Oakland, CA (US)

(73) Assignee: Pebble Technology, Corp., Redwood City, CA (US)

( * ) Notice: Subject to any disclaimer, the term of this patent is extended or adjusted under 35 U.S.C. 154(b) by 0 days.

(21) Appl. No.: 15/051,527

(22) Filed: Feb. 23, 2016

(51) Int. Cl.
| | | |
|---|---|---|
| G06F 3/048 | (2013.01) | |
| G06F 3/0482 | (2013.01) | |
| H04B 1/3827 | (2015.01) | |
| H04L 29/08 | (2006.01) | |
| H04W 68/00 | (2009.01) | |
| G06F 1/16 | (2006.01) | |
| G06F 3/0486 | (2013.01) | |
| G06F 3/0485 | (2013.01) | |

(52) U.S. Cl.
CPC ............ *G06F 3/0482* (2013.01); *G06F 1/163* (2013.01); *G06F 3/0485* (2013.01); *G06F 3/0486* (2013.01); *H04B 1/385* (2013.01); *H04L 67/10* (2013.01); *H04L 67/22* (2013.01); *H04W 68/005* (2013.01)

(58) Field of Classification Search
CPC ....................................................... G06F 3/048
See application file for complete search history.

(56) References Cited

U.S. PATENT DOCUMENTS

| | | | |
|---|---|---|---|
| 8,941,500 B1* | 1/2015 | Faaborg | G08B 21/18 340/539.11 |
| D733,142 S | 6/2015 | Solomon et al. | |
| D743,278 S | 11/2015 | Solomon et al. | |
| D745,515 S | 12/2015 | Solomon et al. | |
| D750,625 S | 3/2016 | Solomon et al. | |
| D752,583 S | 3/2016 | Solomon et al. | |
| D755,178 S | 5/2016 | Solomon et al. | |
| 2013/0040610 A1* | 2/2013 | Migicovsky | H04L 1/1867 455/412.2 |
| 2015/0120845 A1* | 4/2015 | McClard | H04L 51/24 709/206 |
| 2015/0126117 A1 | 5/2015 | Wong et al. | |
| 2015/0223033 A1 | 8/2015 | Migicovsky et al. | |
| 2015/0223034 A1 | 8/2015 | Migicovsky et al. | |
| 2015/0269009 A1* | 9/2015 | Faaborg | G06F 9/546 719/315 |

(Continued)

FOREIGN PATENT DOCUMENTS

| | | |
|---|---|---|
| EP | 2504961 | 10/2012 |
| EP | 002655142-0001 | 3/2015 |
| EP | 002655118-0001 | 4/2015 |

OTHER PUBLICATIONS

U.S. Appl. No. 14/693,557, filed Apr. 22, 2015, Behrens, et al.

*Primary Examiner* — Thanh Vu
(74) *Attorney, Agent, or Firm* — Rutan & Tucker LLP

(57) ABSTRACT

Provided herein is apparatuses and methods for notifications from applications displayed on a wearable electronic device. An action prioritization routine optimizes the display of the possible selectable action items associated with notifications as well as controls a number of other functions regarding notifications.

20 Claims, 14 Drawing Sheets

(56) References Cited

U.S. PATENT DOCUMENTS

| | | |
|---|---|---|
| 2015/0333302 A1 | 11/2015 | Johns et al. |
| 2015/0334772 A1 | 11/2015 | Wong et al. |
| 2015/0341903 A1* | 11/2015 | Jeong .................. H04W 68/02 455/458 |

* cited by examiner

Managing notifications for a wearable electronic device with an action prioritization routine.
450

Configuring the action prioritization routine to receive the notifications corresponding to any of a message, an event, and an alert of another application resident in an associated mobile electronic device.

Prioritizing two or more action items associated with each active notification with the action prioritization routine. The prioritization may be based on a combination of i) a first original prioritization order suggested by a developer of a corresponding application, ii) a second prioritization order manually arranged by a user, iii) a third prioritization order based on a usage pattern of the user, and iv) a filter to remove action items when one or more of the set of possible action items is hidden or removed from the set of potential actions that are listed because either that action item is not currently supported by the wearable electronic device or the action item is not deemed relevant for the wearable electronic device.

Restricting by the notification managing service one or more action items associated with an active notification from being prioritized and displayed on the wearable electronic device, either because the action items are not supported by the wearable electronic device or because the action items are not deemed relevant for the wearable electronic device.

Figure 8A

A weighting function is configured to execute on the cloud-based server, and to originally determine the list of action items associated with each notification based on i) the most common action items generally taken by the users based on the aggregated logged action items of all users, ii) the action items being relevant to the wearable electronic device, and iii) the action items suggested by the developer of the corresponding application.

Providing by the notification managing service a first popup user interface to enable or disable all applications from sending notifications;

Providing by the notification managing service a second user interface to enable or disable the applications from sending notifications one by one; and wherein only the action items associated with the enabled applications are prioritized and are pushed to the wearable electronic device.

Providing by the notification managing service a third user interface for the user to select, for each activate notification, a time period the notification is permitted to be pushed to the wearable electronic device.

Presenting a user interface to allow a user to choose a vibration pattern from a plurality of possible vibration pattern to associate certain vibration patterns with specific applications that generate a notification to the wearable electronic device.

Figure 8C

Displaying an active notification and its prioritized action items on a display screen of the wearable electronic device.

Selecting by the notification managing service one or more of the prioritized action items of each active notification based on available screen space on the wearable electronic device, where the selected action items are displayed on the display screen of the wearable electronic device without a need to scroll down.

Sequentially offering the prioritized action items to the user of the wearable electronic device as selectable action items.

Figure 8D

CONTROLLING AND OPTIMIZING ACTIONS ON NOTIFICATIONS FOR A MOBILE DEVICE

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD

Embodiments generally relate to taking actions on notifications on a wearable electronic device.

BACKGROUND

A current trend is to add more action items to be available for a given notification. Developers are adding more features and more types of actions allowed for notifications. Third parties are adding action items available for existing applications. However, the display screen real estate of a wearable device is not significantly increasing.

SUMMARY

Provided herein are apparatuses and methods for notifications from applications displayed on a wearable electronic device. An action prioritization routine optimizes the display of the possible selectable action items associated with notifications.

In an embodiment, an apparatus for managing notifications for a wearable electronic device can include the following. A notification managing service with data and one or more routines storable in a memory in any of i) in the associated mobile electronic device, ii) in the wearable electronic device, or iii) in a combination of both, in an executable format. The routines of the notification managing service are configured to be executed by one or more processors in any of i) in the associated mobile electronic device ii) in the wearable electronic device, or iii) in a combination of both. The notification managing service includes an action prioritization routine.

The action prioritization routine may receive the notifications corresponding to any of a message, an event, and an alert of an example application of an associated mobile electronic device and to prioritize two or more action items associated with that application. The action prioritization routine may prioritize an order of appearance of action items in a set of possible actions associated with the notification based on two or more factors of i) an original prioritization order suggested by a developer of the first application pushing the notifications to the wearable electronic device, ii) a prioritization order manually set by a user the wearable electronic device, iii) a prioritization order set based on an actual usage pattern of the user the wearable electronic device, and iv) whether one or more of the set of possible action items is hidden or removed from the set of potential actions that are listed because either that action item is not currently supported by the wearable electronic device or the action item is not deemed relevant for the wearable electronic device. The notification managing service may publish a first notification and its prioritized order of appearance of action items to be displayed on a display screen of the wearable electronic device. The prioritized action items are sequentially offered to the user of the wearable electronic device as selectable action items based on the action prioritization routine's prioritization of the order of appearance of action items associated with the notification based on the two or more factors. Any portions of the notification managing service implemented in software can be stored on a non-transitory computer-readable medium in an executable format.

DRAWINGS

The drawings refer to embodiments of the design in which:

FIGS. 8A-8D illustrate an embodiment of example flow diagram of a method of managing notifications for a wearable electronic device.

Figure 1:
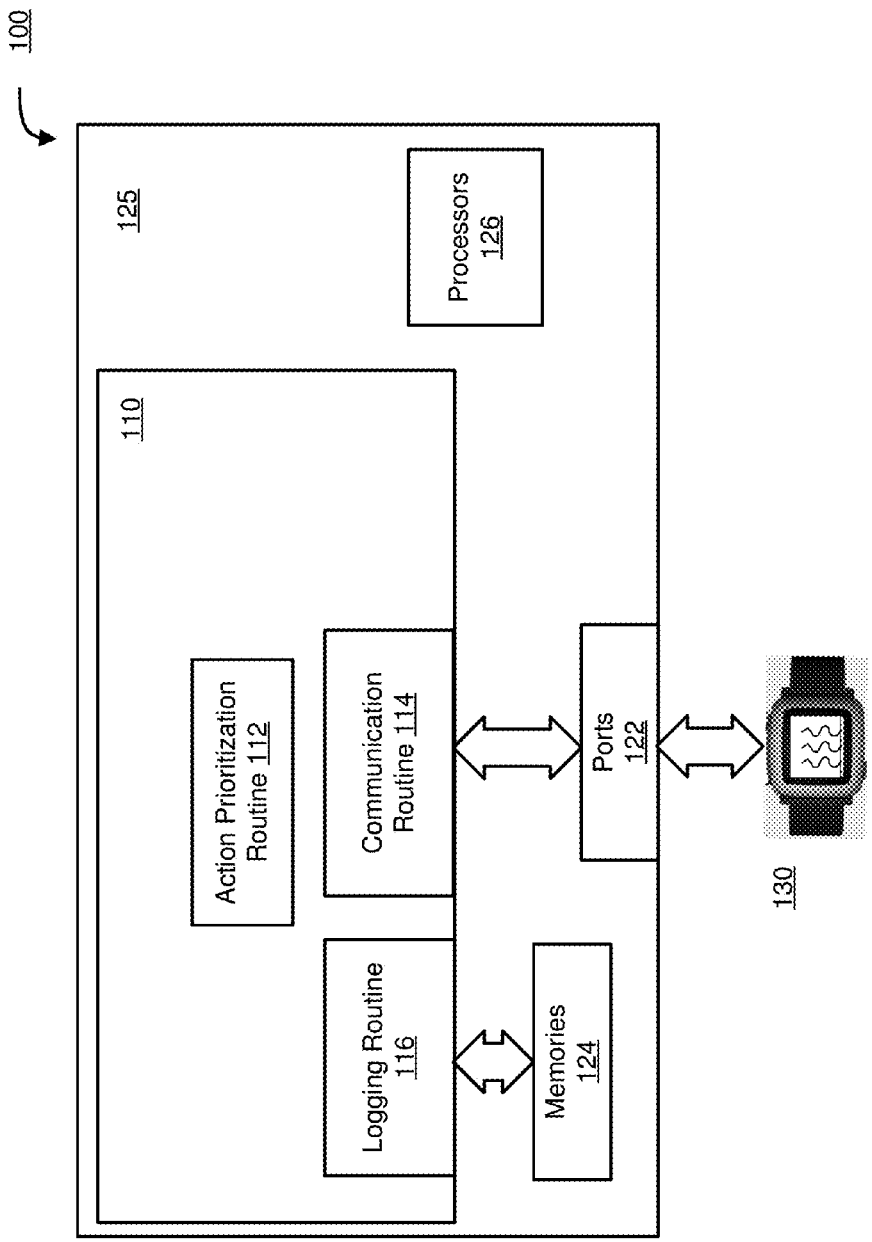
FIG. 1 illustrates an embodiment of a notification managing service with an action prioritization routine on a wearable electronic device, on the associated mobile electronic device, or on a combination of both.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DESCRIPTION

In the following description, numerous specific details are set forth, such as examples of specific data signals, named components, memory in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as first driver, can be made. However, the specific numeric reference should not be interpreted as a literal sequential order but rather interpreted that the first notification is different than a second notification. Thus, the specific details set forth are merely exemplary. The specific details can be varied from and still be contemplated to be within the spirit and scope of the present design. The term coupled is defined as meaning connected either directly to the component or indirectly to the component through another component.

In an embodiment, a method of managing notifications for a wearable electronic device is discussed. The wearable electronic device may wirelessly couple to an associated mobile electronic device to prioritize an order of appearance of action items associated with the notifications from one or more applications. A notification managing service that includes an action prioritization routine. The action prioritization routine receives the notifications corresponding to any of a message, an event, and an alert of another application resident in an associated mobile electronic device. Two or more action items associated with each active notification are prioritized by the action prioritization routine. The prioritization is based on a combination of i) a first original prioritization order suggested by a developer of a corresponding application, ii) a second prioritization order manually arranged by a user, iii) a third prioritization order based on a usage pattern of the user, and iv) a filter to remove action items when one or more of the set of possible action items is hidden or removed from the set of potential actions that are listed because either that action item is not currently supported by the wearable electronic device or the action item is not deemed relevant for the wearable electronic device.

The active notification and its prioritized action items are displayed on a display screen of the wearable electronic device. The prioritized action items are sequentially offered to the user of the wearable electronic device as selectable action items. Any portions of the message notification application implemented in software can be stored on a non-transitory computer-readable medium in an executable format. The action prioritization routine optimizes the display of the possible selectable action items associated with notifications as well as controls a number of other functions regarding notifications.

FIG. 1 illustrates an embodiment of a notification managing service 110 with an action prioritization routine 112 on a wearable electronic device 130, on the associated mobile electronic device 125, or on a combination of both. While FIG. 1 shows the action prioritization routine 112 on the associated mobile electronic device 125, as mentioned above and in the below discussion, this routine 112 can also be solely on the wearable electronic device 130 or on both. The action prioritization routine 112 optimizes the display of the possible selectable actions associated with notifications. This customizes the actions associated with notifications to be optimized for that individual user so that they can focus on the small set of action items actually displayed on the display screen of the wearable electronic device 130 when a notification occurs without having to scroll down to get to a desired action item.

In an embodiment, the wearable electronic device 130 has a communication circuit and routine to wirelessly couple to a partner application in the associated mobile electronic device 125, via its communication circuit and routine 114. In one embodiment, a notification managing service 110 can be stored in the memory 124 of the associated mobile electronic device 125 and executed by the processor in the associated mobile electronic device 125.

The notification managing service 110 with data and one or more routines can be stored in its entirety or have portions of the service stored in a memory in any of i) in the associated mobile electronic device 130, ii) in the wearable electronic device 130, or iii) in a combination of both, in an executable format. The routines of the notification managing service 110 are configured to be executed by one or more processors in any of i) in the associated mobile electronic device 130 ii) in the wearable electronic device 130, or iii) in a combination of both. The notification managing service 110 includes an action prioritization routine 112. The action prioritization routine 112 is configured to receive the notifications corresponding to any of a message, an event, and an alert of an application of an associated mobile electronic device 130 and to prioritize two or more action items associated with that application. The action prioritization routine 112 may prioritize an order of appearance of action items in a set of possible actions associated with the notification based on two or more factors of i) an original prioritization order suggested by a developer of that application pushing the notifications to the wearable electronic device, ii) a prioritization order manually set by a user the wearable electronic device, iii) a prioritization order set based on an actual usage pattern of the user the wearable electronic device, and iv) a filter to remove action items when one or more of the set of possible action items is hidden or removed from the set of potential actions that are listed because either that action item is not currently supported by the wearable electronic device or the action item is not deemed relevant for the wearable electronic device.

The notification managing service 110 may publish the notification and its prioritized order of appearance of action items to be displayed on a display screen of the wearable electronic device 130. The prioritized action items are sequentially offered to the user of the wearable electronic device 130 as selectable action items based on the action prioritization routine's prioritization of the order of appearance of action items associated with the notification based on the two or more factors.

The action prioritization routine 112 has a weighting algorithm to factor in some or all four factors when prioritizing the order of appearance of action items in the set of possible actions associated with the notification.

As discussed, the action prioritization routine 112 allows for the prioritizing appearance of actions on the display screen for notifications as well as control over whether certain actions appear at all on the display screen as well as which applications will be allowed to send notifications to the wearable electronic device 130.

Initially, the action prioritization routine 112 has a filter to look and remove any actions associated with notifications that are not supported by the wearable electronic device 130 as well as removes any actions listed in a database that do not make sense for the wearable electronic device use case. The action prioritization routine 112 may filter out actions that simply are not useful to the user of this wearable electronic device. Next, the action prioritization routine 112 may do a second level of filtering by prioritizing which actions actually appear on the display screen without having to scroll down to be able to select that action. This second level of filtering makes sure the most important actions and most used actions, particular to this user, are customized to the weighted order of appearance to appear on the display screen of the wearable electronic device 130. The action prioritization routine 112 allows the most important actions associated with that specific application to appear on the display screen space available. Each application may have its own set of actions that is available for that particular notification.

Figure 2:
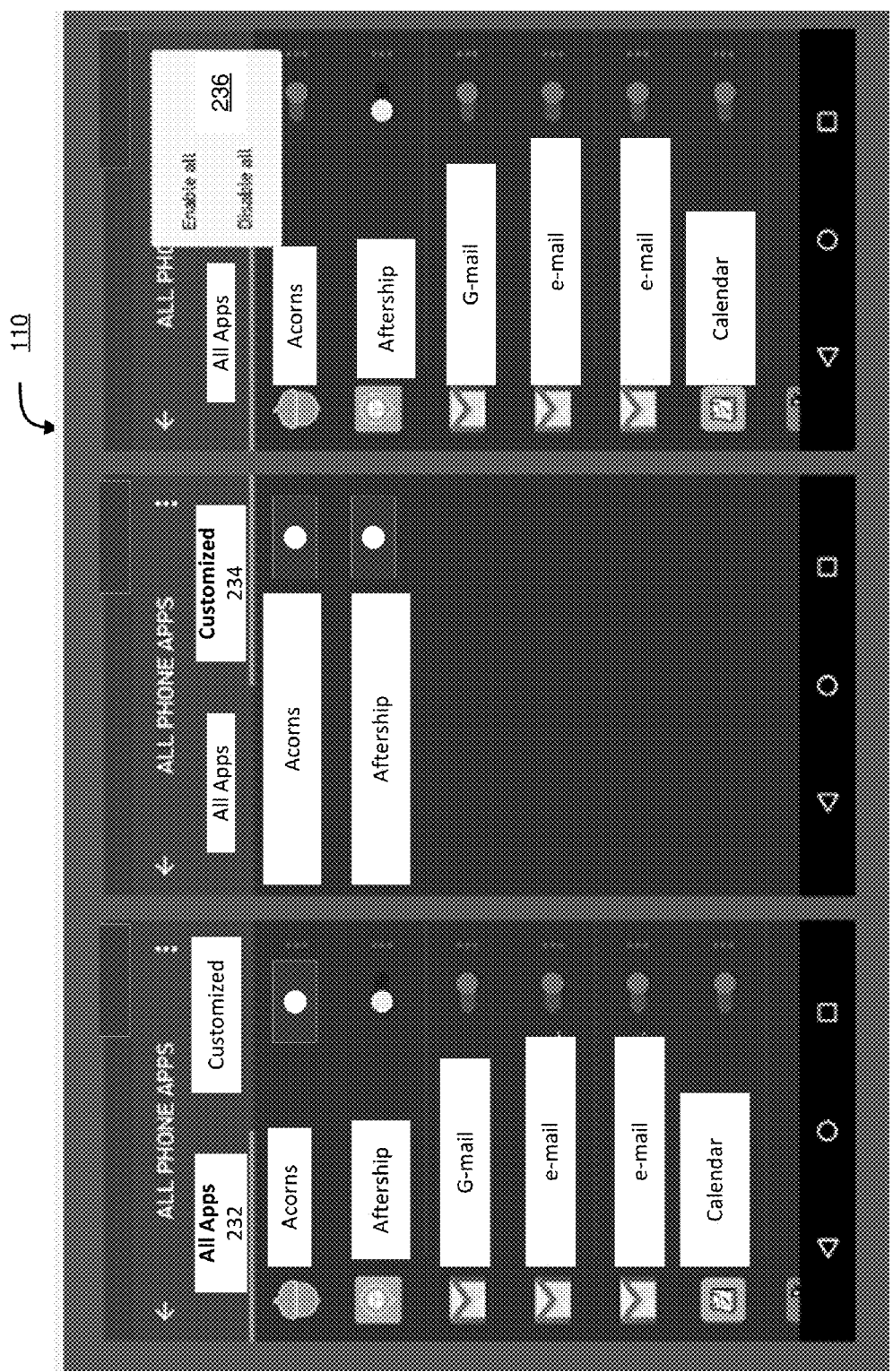
FIG. 2 illustrates an embodiment of the notification managing service presenting one or more user interfaces to enable or disable notifications as well as set which applications will have their action items prioritized in an order of appearance of action items.

FIG. 2 illustrates an embodiment of the notification managing service presenting one or more user interfaces to enable or disable applications from sending notifications as well as set which applications will have their action items prioritized in an order of appearance of action items. A first user interface presents a listing of all applications, such as smart phone applications, that push notifications to the wearable electronic device, such as a smart watch. The first user interface presents the applications, for example on a mobile device, that pushes notifications to the wearable electronic device. The first user interface presents the applications in sequential listed order in the most recent notification activity. This causes applications on the mobile device that do not push notifications to the wearable electronic device to naturally be pushed downward to the bottom of the list of this user interface and makes active applications pushing notification up towards the top of the list to be displayed to the user of the wearable electronic device by this user interface. Setting up prioritization of an order of appearance of action items for a smaller set of applications rather than every application can improve the user's experience.

Next, one of the applications that push notifications to the wearable electronic device may be an application called, for example, 'Acorns™' and it's button is turned on/enabled at this point. Another application that pushes notifications to the wearable electronic device is called, for example, 'Aftership™' and it's button is pushed into the on/enabled position. A third application is called Calendar and its button is pushed into the off/disabled position. Each application that pushes a notification to the wearable electronic device on this user-interface has two user selectable objects they can interact with to control notifications and the potential actions corresponding to the notification. The first object shown is a button programmed to either to prevent or to allow, enable or disable, notifications from the application to be pushed to the wearable electronic device. Thus, i) the application does in fact send notifications to the wearable electronic device and is being allowed to send those notifications or ii) the application is being blocked from sending notifications to the wearable electronic device. The second object is shown as three little touch screen dots and those three little dots control action items associated with the notifications. The three little dots control action items to allow the user to customize the sequential listing of the action items as well as set up potentially automatic action items that will generally be taken upon receipt of that notification.

The notification managing service is configured i) to provide a first popup user interface 236 to enable or disable all applications from sending notifications, and ii) to provide a second user interface to enable or disable the applications from sending notifications one by one via the slider bar. The notification managing service is configured so only the action items associated with the enabled applications are prioritized by the action prioritization routine and are pushed to the wearable electronic device.

The action prioritization routine and partner mobile application cooperate on a first level to allow the user to decide to have all, some, or no notifications on the wearable electronic device. The next level of this cooperation determines which individual phone applications have an ability to push notifications to the smart watch and select which of those applications that the user wants to select to receive the notifications from.

The first tab 232 on the user interface presenting all the applications is called the 'all apps' tab.

The pop-up user interface 236 is also coded to allow the user to either enable all notifications from all applications to be sent to the watch or to disable all notifications from all applications from being sent to the wearable electronic device with a single press by the user. Thus, the wizard for the pop-up user interface 236 is coded to move the slider bar object for all the applications either to the left and enable all applications to send notifications or to move the slider bar to the right and prevent/disable all notifications. The user may then selectively turn on or off only the mobile applications they want to receive notifications from via the slider bar. For example, the user may use the pop up user interface 236 to disable all notifications to the wearable electronic device from all of the smart phone applications. Then on the next step, that user then may turn on/enable merely a few desired mobile applications, such as three or five applications, by pushing their slider bar over to the left to turn on those applications and receive notifications from those apps. The pop-up user interface 236 just speeds up the process of the user selectively customizing enabling or disabling receiving notifications from specific applications out of all the applications resident on the phone that they wish to receive notifications from. The mobile application cooperating with the notifications application on the wearable electronic device allows these user configurations to configurability turn on (enable) and off (disable) notifications coming from the applications resident on the smart phone or from some other source sending the notifications.

The second tab 234 on this user interface is called the 'customized tab.' The customize tab 234 shows applications that have actions associated with the notifications and the user has come along and manually customized the sequential order that those potential actions will appear on the display screen of the wearable electronic device. The second tab 234 can include the user's preference on which applications would be muted and when. The customized tab 234 for the user interface will show all phone applications that have notifications being pushed to the wearable electronic device in which the user has manually set what order they would like those actions to sequentially appear on the wearable electronic device. The action prioritization routine allows the user to manually arrange the sequential order in which the set of potential actions are listed. The user interface may allow a user to drag and drop actions within the set of possible actions into what sequential order of these actions should appear on the wearable electronic device.

Figure 4A:
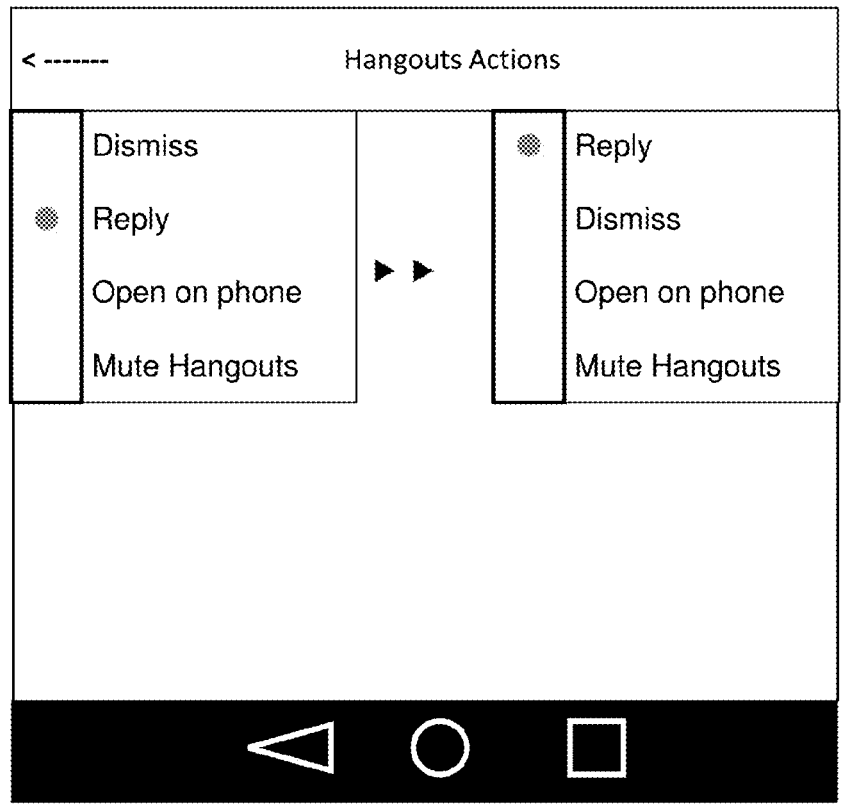
FIGS. 4A and 4B illustrate embodiments of examples of prioritized action items that are sequentially offered to the user of the wearable electronic device as selectable action items based on the action prioritization routine's prioritization of the order of appearance of action items associated with the notification based on the two or more factors.
Figure 4A:
Figure 4B:
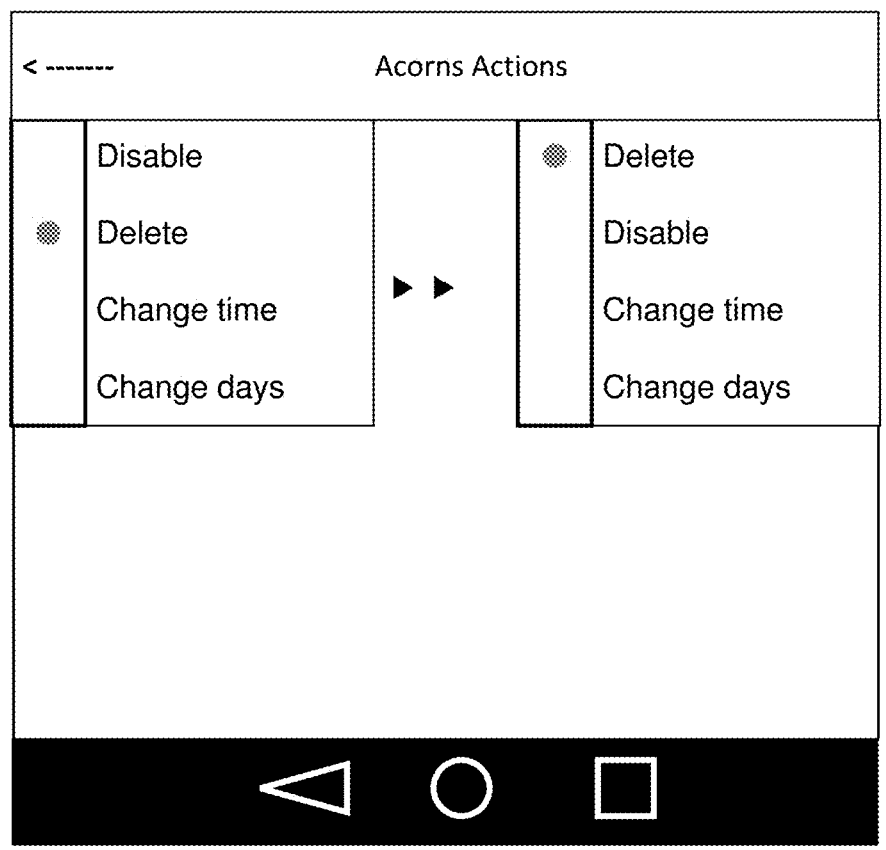

For example see FIG. 4B, the user interface 402 presents an option of reordering the set of possible action items of, for example 'Disable,' 'Delete,' 'Change time,' and 'Change days,' the listed sequential order that they would appear on the display screen. The user interface may allow the user to manually drag-and-drop which possible action should be, for example, first or second. In this example, the action items of 'Disable,' 'Delete,' have been changed in order of appearance by the user.

The action prioritization routine of the notification managing service may provide a popup user interface for the user to drag and drop action items within the set of possible action items of the notification for each application that supplies notifications in order to sequentially arrange the action items to manually set the prioritization order set by the user the wearable electronic device. The prioritization order manually set by the user the wearable electronic device is stored in the memory and then referenced by the action prioritization routine to determine the order of appearance of action items on the display screen.

In one embodiment, typically a software developer that created the application may have a suggested sequential order that the set of potential actions that can be taken associated with a notification should appear on a display screen on the wearable electronic device. However, the action prioritization routine can alter and change the sequential order in which the set of potential action items that can be taken for a notification will actually appear on the display screen of the wearable electronic device.

The action prioritization routine may factor in aggregate user-use case information from a weighting algorithm. A weighting algorithm, from a cloud based intelligence engine resident in a service site in the cloud, looks over all user-use cases from a plurality of wearable electronic devices, looks over the logged data of the most common actions taken with the notification from this particular application, and then feeds that information back to the action prioritization routine. The weighting algorithm also tracks a use case for this specific user and the frequency and preference of actions taken to a notification from that specific application by the user. The weighting algorithm suggests what order that the most commonly used actions associated with this particular application should appear sequentially on the display screen of the wearable electronic device.

The notification managing service may restrict one or more action items associated with an active notification from being prioritized and displayed on the wearable electronic device, either because the action items are not supported by the wearable electronic device or because the action items are not deemed relevant for the wearable electronic device. The action prioritization routine may factor in iv) whether one or more of the set of possible actions is hidden or removed from the set of potential actions that are listed because either that action is not currently supported by the wearable electronic device or the action is not deemed relevant for the wearable electronic device. The intelligence engine in the cloud looks at the actions associated with the notification and may look at a list or index of actions to automatically hide or remove actions that are not supported by the wearable electronic device and send this list to all of the wearable electronic devices. The intelligence engine in the cloud also looks at a list or index of actions that generally do not make sense for the wearable electronic device use case and sends this list to all of the wearable electronic devices.

Generally, let's say the top two or three possible action items will have room to appear on the display screen of the wearable electronic device and the remainder of the set of possible actions, if the user wants to be able to take that action, the user will need to actively scroll down the sequential order of listed action items to be able to select that action which did not initially appear on the display screen of the wearable electronic device. Thus, merely the initial two or three possible action items in sequential order of the set of possible actions will appear on the display screen and be readily selectable for the user and the rest of the possible actions will need to be scrolled down to get to that other action item in order to take that action in response to the notification. The action prioritization routine is configured to intuitively assist the user in controlling what is displayed and in what order.

Figure 3:
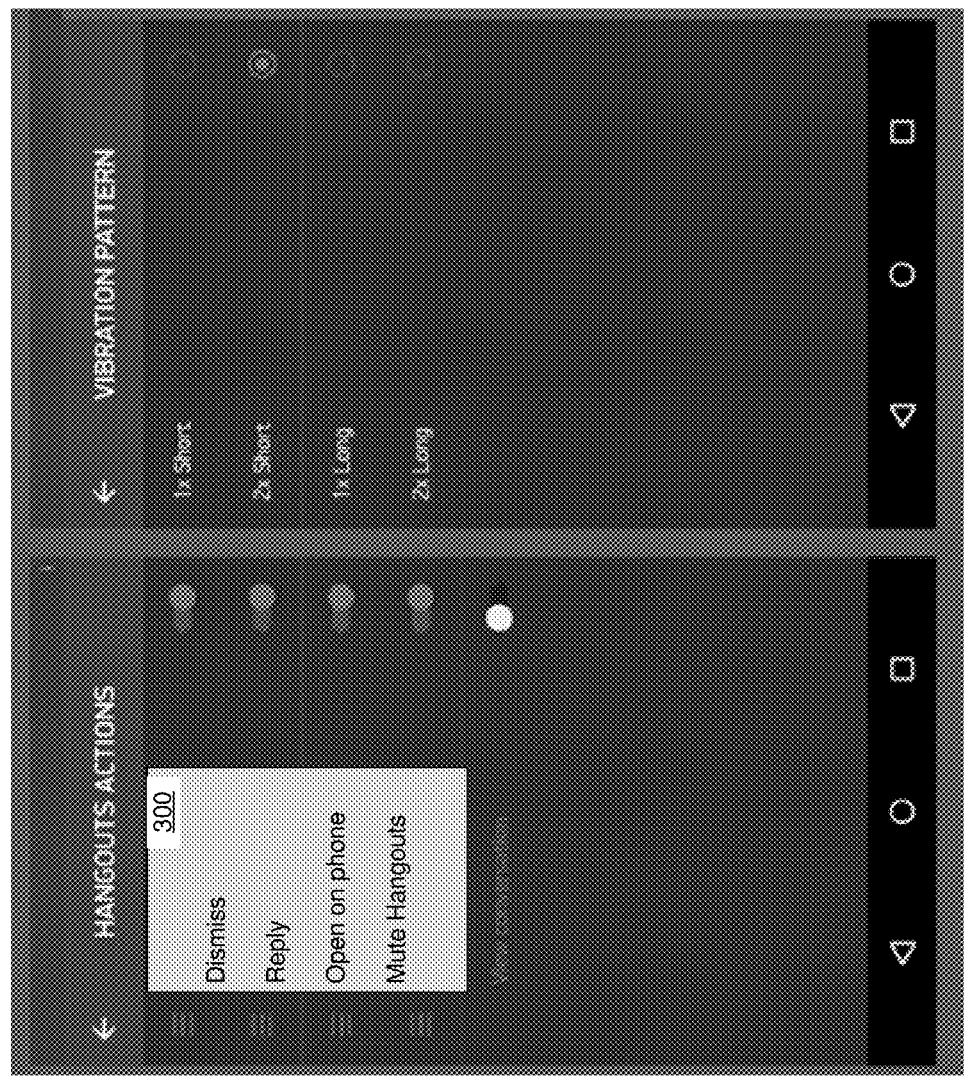
FIG. 3 illustrates an embodiment of the notification managing service presenting one or more user interfaces to show a list of actions associated with an example application and the possible action items.

FIG. 2 shows a user interface that is presented on a display screen with the three little dots. FIG. 3 shows a user interface that is presented on a display screen to the user when those three little dots are actuated by the user. The user-interface on FIG. 3 presents a window 300 with potential action items that may be taken for an example application.

FIG. 3 illustrates an embodiment of the notification managing service presenting one or more user interfaces to show a list of actions associated with an example application and the possible action items. The example actions shown associated with an application called, for example, Hangout and the listed possible action items. The Hangout action items of 'Dismiss,' 'Reply,' 'Open on phone,' and 'Mute Hangouts'. The sequential order that the top two or three of these possible action items will initially appear on the display screen is controlled by the action prioritization routine.

FIGS. 4A and 4B illustrate embodiments of examples of prioritized action items that are sequentially offered to the user of the wearable electronic device as selectable action items based on the action prioritization routine's prioritization of the order of appearance of action items associated with the notification based on the two or more factors. The action prioritization routine and partner mobile application cooperate at a level to select what action items to take for a notification and the sequential order that the action items appear on the display screen of the electronic device without having to scroll down to find additional actions that are programmed in as possible actions but generally actions that this particular user usually does not want to take.

The action prioritization routine displays one or more of the prioritized action items based on an available screen space on the wearable electronic device. A highest rated set of action items are displayed on the display screen of the wearable electronic device without a need to scroll down. See FIG. 4A and possibly there is only room to display the action items of 'Dismiss' and 'Reply' with the appearance of the notification on the display screen without the user having to scroll down to get to the 'Open on phone,' and 'Mute Hangouts' action items. The display screen space 400 limits the displayed action items that should appear on the display screen without having to scroll further. And, the action prioritization routine tries to intuitive assist in displaying the most important action items that should appear on the display screen without having to scroll further down to get to the action item the user wishes to take regard to the notification.

The action prioritization routine may determine a current sequential order that actions associated with the notifications appear on the display screen taking into account the elements of i) manual adjustments to an order of a set of possible actions from the user, ii) developer suggested prioritization listing of the set of possible actions, iii) whether one or more of the set of possible actions is hidden or removed from the set of potential actions that are listed because either that action is not currently supported by the wearable electronic device or the action is not deemed relevant for the wearable electronic device, and iv) then a weighting algorithm that tracks any of a use case for all users as well as a use case for this specific user based on the frequency and preference of actions taken to a notification from that specific application. In an embodiment, the action prioritization routine looks at least these four elements in order to determine the actual listing of the action items that will appear on the display screen and the sequential order in which those action items should appear.

The action prioritization routine filters the displayed actions down to the most important actions that should appear on the display screen without having to scroll further to get to the action user wishes to take regard to the notification. As discussed above, the listing of the order can be based on this user's particular behavior, which can be intelligently set by the backend system, as well as can be manually set by the user via the user interface.

Third parties may provide additional action items available for existing applications. Those additional action items will be shown with the developer's initial action items for prioritization. Thus, some times other entities add to the possible action items that can be taken in regard to a notification from an application and these possible action items should be prioritized.

Thus, the action prioritization routine allows the presented set of action items taken response to notification to be in order different than the one originally set by the developer of the application pushing the notification to the wearable electronic device. In addition, the set of action items may even have some actions that are removed because they are not supported or simply do not make sense for the wearable electronic device use case versus a phone use case.

In an embodiment, the order may start off with the sequential order set by the developer who is pushing the notification to the wearable electronic device and their suggestion but then it is modified as follows. The action prioritization routine weights the factors as i) a filter that cuts out all actions that are not supported on the device as well as all these actions that don't make sense, then ii) puts the highest weighting ordering of prioritization to the manual setting from the user, and iii) then factors in the individual user's use case of action items taken for this application as well as the general user use-case analysis coming from the intelligence engine in the cloud.

Figure 5:
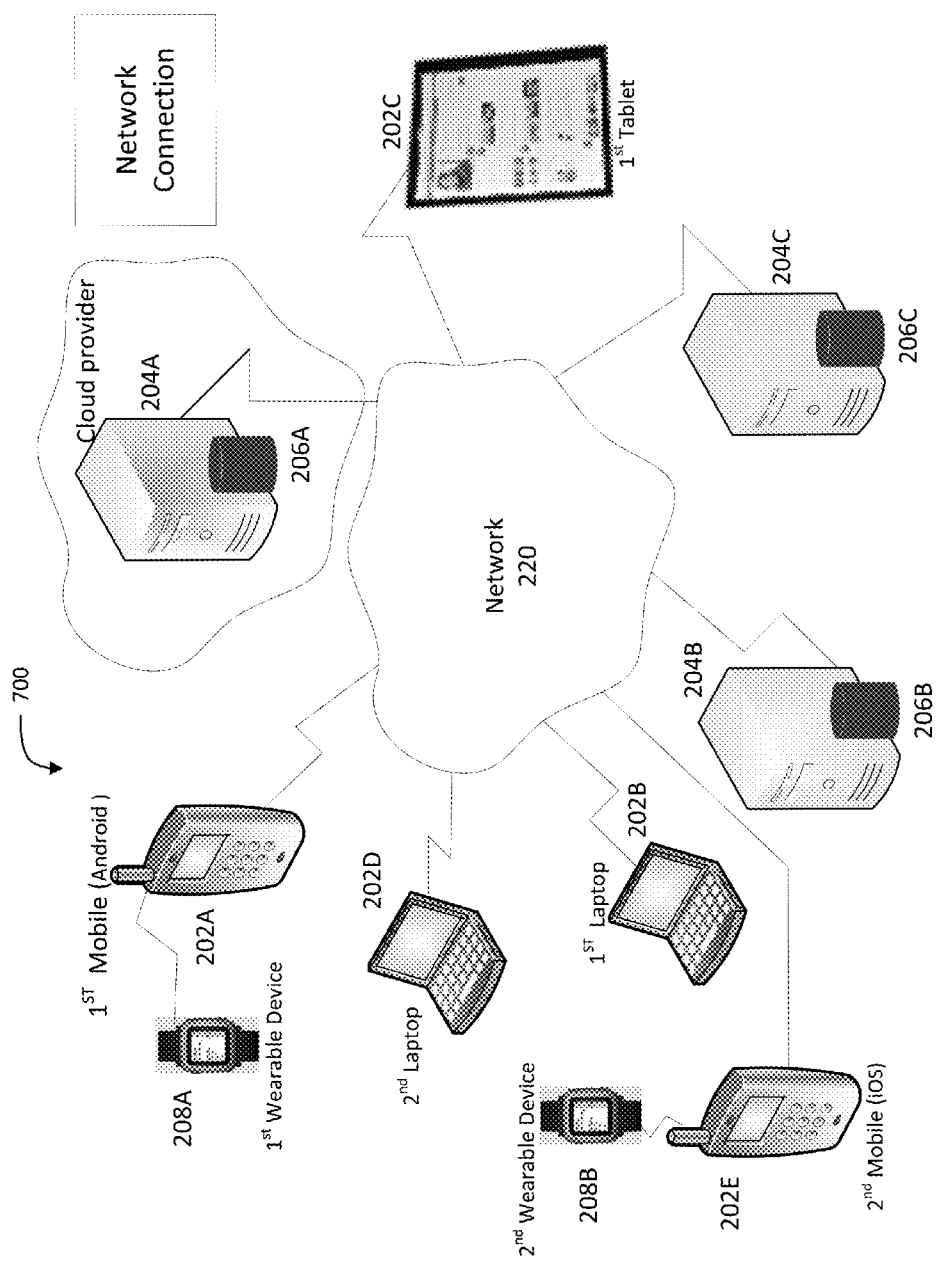
FIG. 5 illustrates an embodiment of a cloud-based server and two or more wearable electronic devices regularly transmitting logged data to the cloud-based server and receiving back analytics of aggregated logged action items of all users of that application on their own wearable electronic device.

FIG. 5 illustrates an embodiment of a cloud-based server and two or more wearable electronic devices regularly transmitting logged data to the cloud-based server and receiving back analytics of aggregated logged action items of all users of that application on their own wearable electronic device. The wearable electronic devices 208A, 208B may remotely access and/or communicate with other devices on a network in accordance with some embodiments. The network environment 700 has a communications network 220 that connects server computing systems 204A through 204C, and at least one or more client computing systems 202A to 202E, as well as 208A and 208B. As shown, there may be many server computing systems 204A through 204C and many client computing systems 202A to 202E, as well as 208A and 208B connected to each other via the network 220, which may be, for example, the Internet.

The cloud-based server 204A can be coupled to two or more wearable electronic devices 208A and 208B and may bi-directionally communicate with the two or more mobile electronic devices 202A, 202B. The cloud-based server 204A may receive and store the logged data of users of the wearable electronic devices that are associated with the two or more mobile electronic devices in a database associated with the cloud-based server.

The notification managing service has a collecting-in and feeder-out routine. The collector and feeder routine logs actions that this user takes regarding each notification and stores that log of actions in a memory of, for example, the mobile device 202A or wearable electronic device 208A. The log of actions is communicated on a regular basis, such as daily, up to the cloud server 204A and its associated database 206A to log the actions and aggregate those logged actions across all user use cases. The actions taken is stored and then indexed in database 206A. An algorithm analyzes to determine the most common actions generally taken with the notifications from particular application. The logging routine may log of action items taken for all received notifications; and thus, the logging routine may log action items of the notifications selected by the user of the wearable electronic device and then to store the logged data in the memory of the associated mobile electronic device 202A, 202E or wearable electronic device 208A, 208B. A communication routine of the notification managing service may communicate to a cloud-based server 204A and to regularly transmit the logged data to the cloud-based server 204A and receive back analytics of aggregated logged action items of all users of the first application on their own wearable electronic device 208A, 208B. The analytics of aggregated logged action items is also weighted into the prioritization order set based on the actual usage pattern of the user the wearable electronic device 208A, 208B.

The analysis routine of the cloud-based server 204A may analyze and to determine based on aggregated logged action items of all users for notifications from all of the applications that may send notifications to the wearable electronic device including a first application as well as logged action items for notifications for a second application. The analysis routine then determines the most common action items generally taken by the users with the notification from each particular application.

Thus, the backend server 204A may look at big data for all users. The backend server 204A has a database 206A that tracks all actions taken for all notifications for all applications and then aggregates this information against all the user use-cases for the wearable electronic devices 208A, 208B in order to be able to intelligently determine the most common actions taken in response to a notification from a particular application. The server in the cloud 204A may also tailor this to an individual user and tailor the use-case to this particular user's behavior. The most commonly action taken regarding a particular notification from an application is then weighted into the ordering of the actions and how they sequentially appear on the display screen of the wearable electronic device. For example, the most common action for an email notification maybe to reply to that email or maybe to archive that email. These actions and the log of these actions is stored in the server and its associated database. The algorithm analyzes all users use-case for patterns of regarding the actions and applications and then can utilize that pattern and weighting information to affect the sequential listing of the actions on the display screen of the wearable electronic device.

In an alternative embodiment, the action prioritization routine of the notification managing service may analyze the logged data stored in the memory of the mobile electronic device associated with the wearable electronic device and to determine, for each active notification, the prioritization order based on the usage pattern of the user of the wearable electronic device.

In some embodiments, the wearable electronic device 208A directly communicates with the partner service in the cloud 204A. In some embodiments, the notification is sent directly to the wearable electronic device 208A from a partner service in the cloud 204A or from a third party sever 204C rather than from a mobile electronic device. In some embodiments, the notification is sent directly to the wearable electronic device without alerting the mobile application and in those instances the wearable electronic device notification application will cooperate with the mobile application and let the mobile application know that a notification has been pushed to the wearable electronic device.

Referring back to FIG. 3, the action prioritization routine also has a user interface configured to allow a user to choose a vibration pattern from a plurality of possible vibration pattern to associate certain vibration patterns with specific applications that generate a notification to the wearable electronic device. The action prioritization routine causes a vibration pattern for notifications associated from a specific application. Thus, the user by feeling a specific vibration pattern, which will indicate to the user, which application is currently sending and giving a notification to the user at that time on the wearable electronic device.

Figure 6:
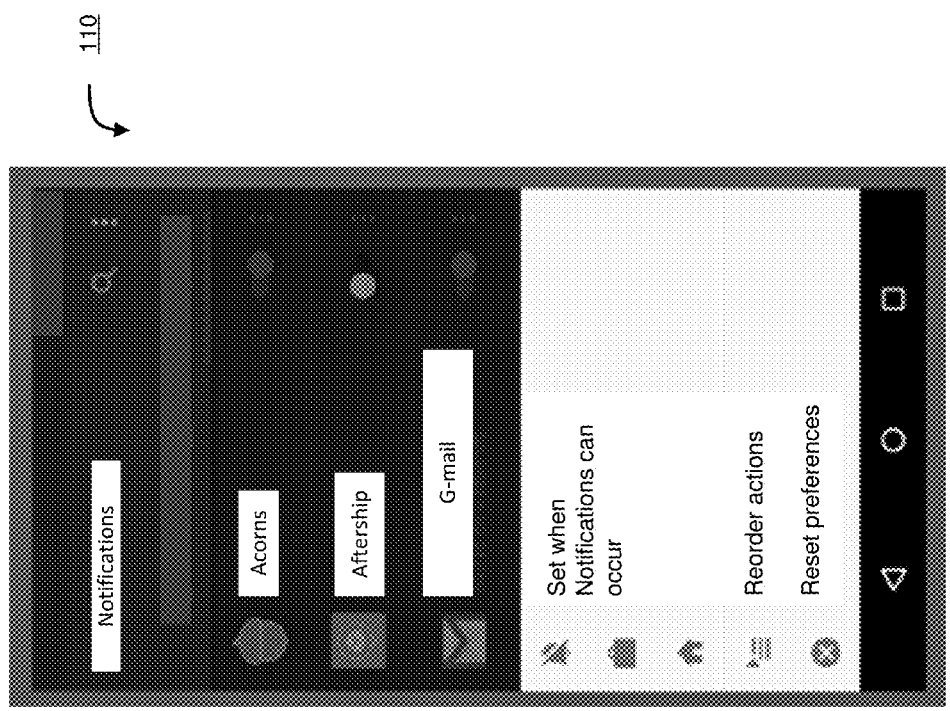
FIG. 6 illustrates an embodiment of the notification managing service presenting one or more user interfaces to choose what time periods receiving notifications from that application is appropriate.

FIG. 6 illustrates an embodiment of the notification managing service 110 presenting one or more user interfaces to choose what time periods receiving notifications from that application is appropriate. The user interface allows the user to choose what time periods receiving notifications from that application is appropriate and at what time periods it is not appropriate to receive notifications. The notification managing service may provide this user interface for the user to select, for each activate notification, one or more time periods during the day when the notification is permitted to be pushed to and displayed on the display screen of the wearable electronic device. The current sequential order of the potential time periods that notifications are permitted to be pushed is, for example, 'Always mute,' 'Mute on weekdays,' and 'Mute on weekends.'

Figure 7A:
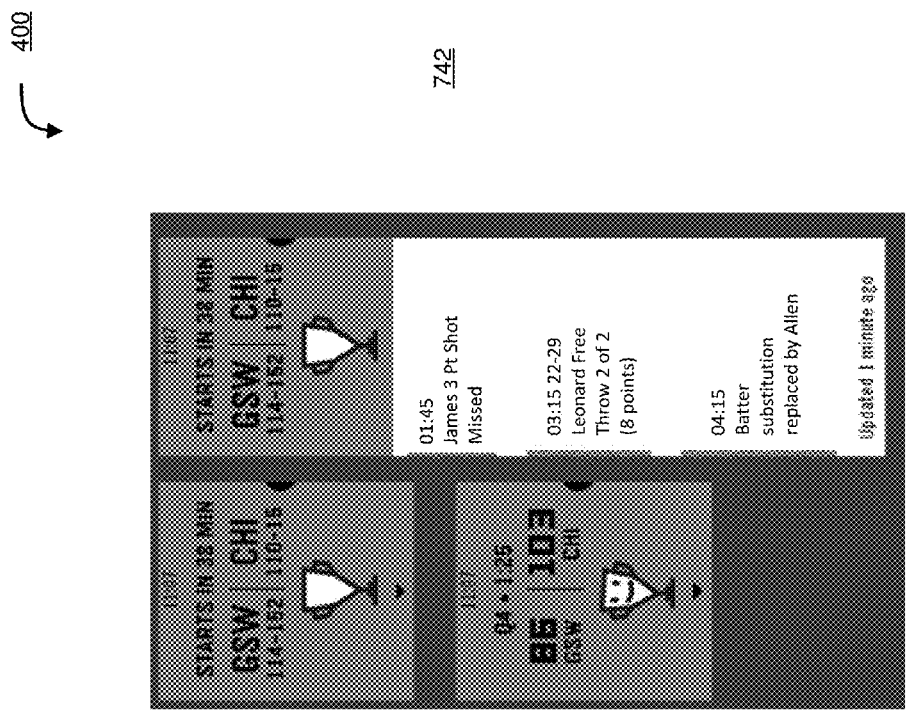
FIGS. 7A & 7B illustrates example notifications of a message from an example application displayed on the wearable electronic device.
Figure 7B:
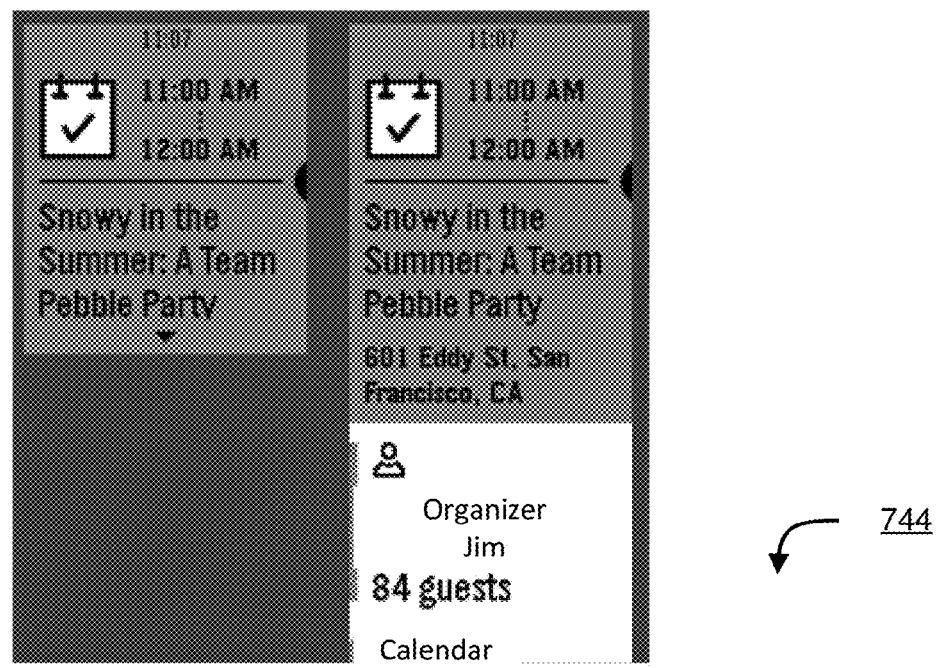
Figure 8B:
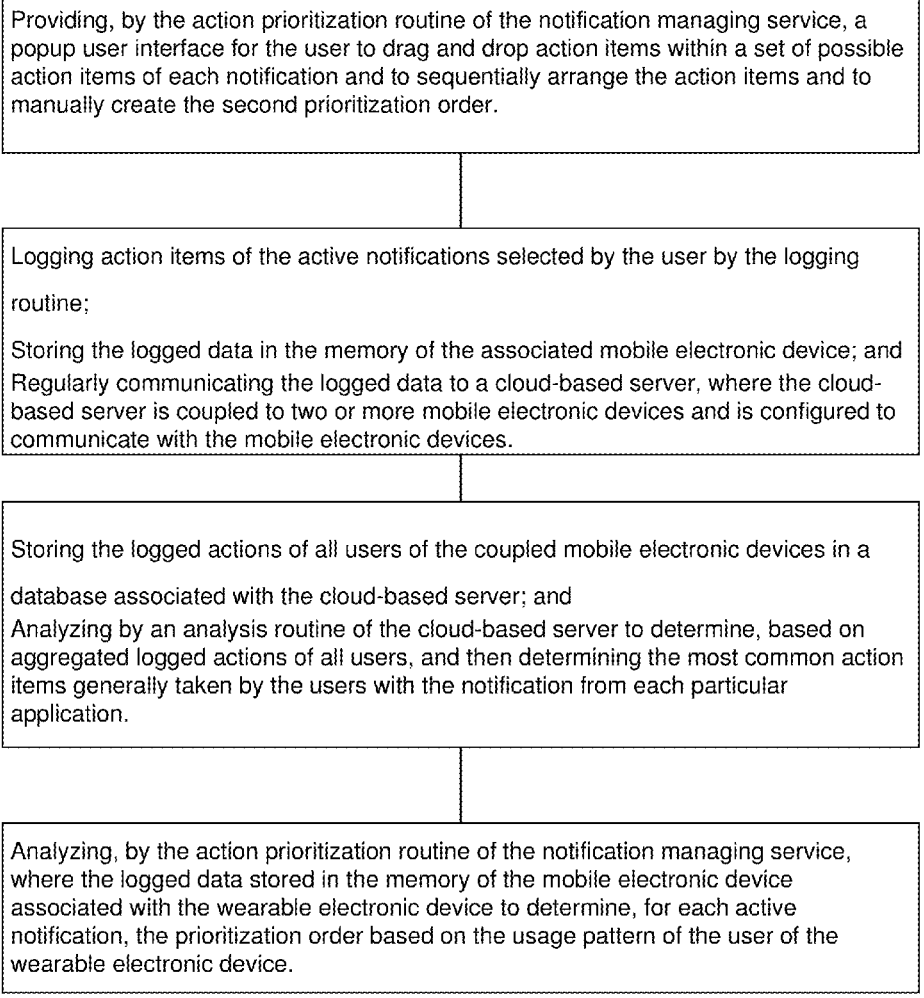

FIGS. 7A and 7B illustrate example notifications from an application displayed on the wearable electronic device. The notification may be of a personal communication, such as a SMS text message and email message or social media messages (e.g., Twitter, Facebook). The notification may of data provided from sensors on the wearable device. For example, step tracking, sleep tracking, heart rate information or other fitness or health related information for the user to take action on. The notification may also be fact based information such as sports scores, horoscopes or other information that the user may take action on. For example, the action may be to store the score or health based information in another application such as a pin on a timeline application. The notification 742, 744 may also be a notification of a calendar event, a timeline pin notification, and other such notifications.

FIGS. 8A-8D illustrate an embodiment of example flow diagram 450 of a method of managing notifications for a wearable electronic device.

Figure 9:
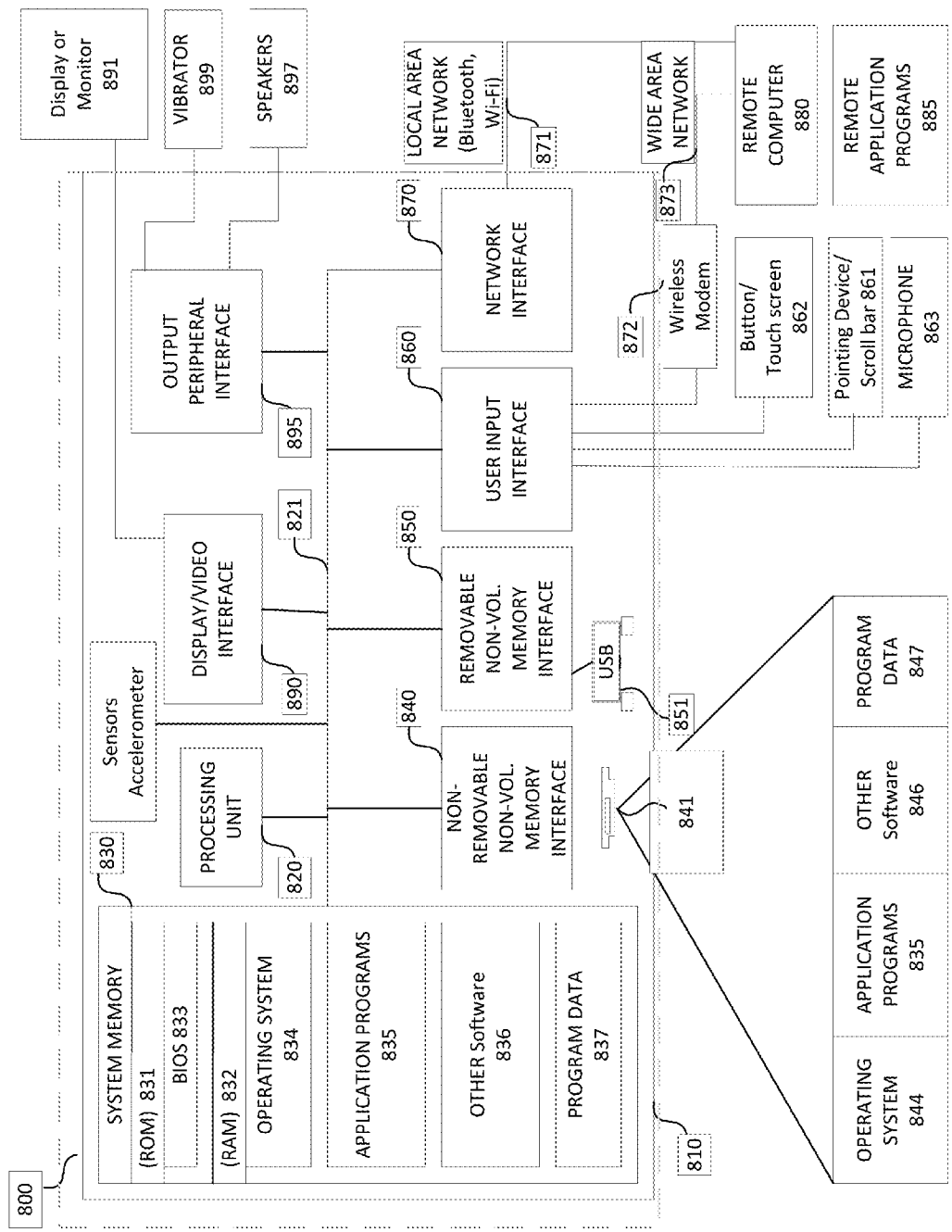
FIG. 9 illustrates an embodiment of an example computing device.

In general, the wearable electronic device includes one or more systems and can be coupled to one or more networks. FIGS. 5 and 9 illustrate additional example environments to implement the concepts.

Referring back to FIG. 5, note, that alternatively the network 220 might be or include one or more of: an optical network, a cellular network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 202A and the server computing system 204A can both initiate and respond to communications, their communication may be viewed as peer-to-peer. Likewise, communications between the server computing systems 204A and 204-B, and the client computing systems 202A and 202C may be viewed as peer-to-peer if each such communicating device is capable of initiation and response to communication. Additionally, server computing systems 204A-204C also have circuitry and software to communication with each other across the network 220. One or more of the server computing systems 204A to 204C may be associated with a database such as, for example, the databases 206A to 206C. Each server may have one or more instances of a virtual server running on that physical server and multiple virtual instances may be implemented by the design. A firewall may be established between a client computing system 202C and the network 220 to protect data integrity on the client computing system 202C. Each server computing system 204A-204C may have one or more firewalls.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicate use of these resources. The user's cloud-based site is given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

The cloud-based remote access is coded to utilize a protocol, such as Hypertext Transfer Protocol (HTTP), to engage in a request and response cycle with both a mobile device application resident on a client device as well as a web-browser application resident on the client device. The cloud-based remote access for a wearable electronic device, can be accessed by a mobile device, a desktop, a tablet device, and other similar devices, anytime, anywhere. Thus, the cloud-based remote access to a wearable electronic device hosted on a cloud-based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud-based remote access to a wearable electronic device, and 5) combinations of these.

In an embodiment, the server computing system 204A may include a server engine, a web page management component, a content management component, and a database management component. The server engine performs basic processing and operating system level tasks. The web page management component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

An embodiment of a server computing system to display information, such as a web page, etc. is discussed. An application including any program modules, apps, services, processes, and other similar software executable when executed on the server computing system 204A, causes the server computing system 204A to display windows and user interface screens on a portion of a media space, such as a web page. A user via a browser from the client computing system 202A may interact with the web page, and then supply input to the query/fields and/or service presented by a user interface of the application. The web page may be served by a web server computing system 204A on any Hypertext Markup Language (HTML) or Wireless Access Protocol (WAP) enabled client computing system 202A or any equivalent thereof. For example, the client mobile computing system 202A may be a wearable electronic device, smart phone, a touch pad, a laptop, a netbook, etc. The client computing system 202A may host a browser, a mobile application, and/or watch specific application to interact with the server computing system 204A. Each application has a code scripted to perform the functions that the software component is coded to carry out such as presenting fields and icons to take details of desired information. Algorithms, routines, and engines within the server computing system 204A take the information from the presenting fields and icons and put that information into an appropriate storage medium such as a database. A comparison wizard is scripted to refer to a database and make use of such data. The applications may be hosted on the server computing system 204A and served to the browser of the client computing system 202A. The applications then serve pages that allow entry of details and further pages that allow entry of more details.

FIG. 9 illustrates a computing system that can be part of one or more of the wearable electronic devices in accordance with some embodiments. With reference to FIG. 8, components of the computing system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

Computing system 810 typically includes a variety of computing machine-readable media. Computing machine-readable media can be any available media that can be accessed by computing system 810 and includes both volatile and nonvolatile media, removable and non-removable media. By way of example, and not limitation, computing machine-readable mediums uses include storage of information, such as computer readable instructions, data structures, other executable software or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computing device 800. Transitory media such as wireless channels are not included in the machine-readable media. Communication media typically embodies computer readable instructions, data structures, other executable software, or other transport mechanism and includes any information delivery media. As an example, some clients on network 220 of FIG. 5 may not have any optical or magnetic storage.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computing system 810, such as during start-up, is typically stored in ROM 831. RAM 832 typically contains data and/or software that are immediately accessible to and/or presently being operated on by processing unit 820. By way of example, and not limitation, FIG. 9 illustrates that RAM can include a portion of the operating system 834, other executable software 836, and program data 837.

As an example, the computer readable storage medium 841 stores Operating System software for smart watches to cooperate with both Android OS and iOS.

The drives and their associated computer storage media discussed above and illustrated in FIG. 8, provide storage of computer readable instructions, data structures, other executable software and other data for the computing system 810. In FIG. 8, for example, the solid state memory 841 is illustrated for storing operating system 844, other executable software 846, and program data 847. Note that these components can either be the same as or different from operating system 834, other executable software 836, and program data 837. Operating system 844, other executable software 846, and program data 847 are given different numbers here to illustrate that, at a minimum, they are different copies. In an example, the operating system, Pebble OS, can be a customized Free RTOS kernel that can communicate with Android and iOS applications using Bluetooth, Wi-Fi, cellular or other communication methodology.

A user may enter commands and information into the computing system 810 through input devices such as a keyboard, touchscreen, or even push button input component 862, a microphone 863, a pointing device and/or scrolling input component 861, such as a mouse, trackball or touch pad. The microphone 863 may cooperate with speech recognition software. These and other input devices are often connected to the processing unit 820 through a user input interface 860 that is coupled to the system bus, but may be connected by other interface and bus structures, such as a parallel port, game port or a universal serial bus (USB). A display monitor 891 or other type of display screen device is also connected to the system bus 821 via an interface, such as a display and video interface 890. In addition to the monitor, computing devices may also include other peripheral output devices such as speakers 897, a vibrator 899, and other output device, which may be connected through an output peripheral interface 890.

The computing system 810 may operate in a networked environment using logical connections to one or more remote computers/client devices, such as a remote computing device 880. The remote computing device 880 may be a wearable electronic device, a personal computer, a handheld device, a server, a router, a network PC, a peer device or other common network node, and typically includes many or all of the elements described above relative to the computing system 810. The logical connections depicted in FIG. 9 include a local area network (LAN) 871 and a wide area network (WAN) 873, but may also include other networks. Such networking environments are commonplace in offices, enterprise-wide computer networks, intranets and the Internet. A browser application may be resident on the computing device and stored in the memory.

When used in a LAN networking environment, the computing system 810 is connected to the LAN 871 through a network interface or adapter 870, which can be a Bluetooth or Wi-Fi adapter. When used in a WAN networking environment, the computing system 810 typically includes a modem 872, e.g., a wireless network, or other means for establishing communications over the WAN 873, such as the Internet. The wireless modem 872, which may be internal or external, may be connected to the system bus 821 via the user-input interface 860, or other appropriate mechanism. In a networked environment, other software depicted relative to the computing system 810, or portions thereof, may be stored in the remote memory storage device. By way of example, and not limitation, FIG. 9 illustrates remote application programs 885 as residing on remote computing device 880. It will be appreciated that the network connections shown are exemplary and other means of establishing a communications link between the computing devices may be used.

As discussed, the computing system may include a processor, a memory, a built in battery to power the computing device, an AC power input to charge the battery, a display screen, a built-in Wi-Fi circuitry to wirelessly communicate with a remote computing device connected to network.

It should be noted that the present design can be carried out on a computing system such as that described with respect to FIG. 9. However, the present design can be carried out on a server, a computing device devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless communication module 872 may employ a Wireless Application Protocol to establish a wireless communication channel. The wireless communication module 872 may implement a wireless networking standard.

Examples of mobile computing devices may be a laptop computer, a smart phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Note, an application herein described includes but is not limited to software applications, mobile apps, and programs that are part of an operation system application. Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the design have been shown the design is not to be limited to these embodiments. For example, most functions performed by electronic hardware components can be duplicated by software emulation. Thus, a software program written to accomplish those same functions can emulate the functionality of the hardware components in input-output circuitry. The design is to be understood as not limited by the specific embodiments described herein, but only by scope of the appended claims.

What is claimed is:

1. An apparatus for managing notifications for a wearable electronic device, comprising:
   a notification managing service with data and one or more routines are configured to be stored in its entirety or have portions of the service stored in a memory in any of
   i) in an associated mobile electronic device,
   ii) in the wearable electronic device, or
   iii) in a combination of both, in an executable format,
   where the routines of the notification managing service are configured to be executed by one or more processors in any of
   i) in the associated mobile electronic device
   ii) in the wearable electronic device, or
   iii) in a combination of both,
   where the notification managing service includes an action prioritization routine;
   where the action prioritization routine is configured to receive the notifications corresponding to any of a message, an event, and an alert of a first application and to
   prioritize two or more action items associated with that first application,
   where the action prioritization routine is configured to prioritize an order of appearance of action items in a set of possible actions associated with a notifications based on two or more factors of
   i) an original prioritization order suggested by a developer of the first application pushing the notifications to the wearable electronic device,
   ii) a prioritization order manually set by a user of the wearable electronic device,
   iii) a prioritization order set based on an actual usage pattern of the user of the wearable electronic device, and
   iv) a filter to remove action items when one or more of the set of possible action items is hidden or removed from the set of potential actions that are listed because either that action item is not currently supported by the wearable electronic device or the action item is not deemed relevant for the wearable electronic device;

where the notification managing service is configured to publish a first notification and its prioritized order of appearance of action items to be displayed on a display screen of the wearable electronic device, where the prioritized action items are sequentially offered to the user of the wearable electronic device as selectable action items based on the action prioritization routine's prioritization of the order of appearance of action items associated with the notification based on the two or more factors; and where any portions of the notification managing service implemented in software can be stored on a non-transitory computer-readable medium in an executable format.

2. The apparatus of claim 1, wherein the notification managing service is further configured
i) to provide a first user interface to enable or disable all applications from sending notifications, and
ii) to provide a second user interface to enable or disable the applications from sending notifications one by one; and wherein only the action items associated with the enabled applications are prioritized by the action prioritization routine and are sent to the wearable electronic device.

3. The apparatus of claim 2, wherein the notification managing service is configured to provide a third user interface for the user to select, for each activate notification, one or more time periods during the day when the notification is permitted to be pushed to and displayed on the display screen of the wearable electronic device.

4. The apparatus of claim 1, wherein the action prioritization routine has a weighting algorithm to factor in all four factors when prioritizing the order of appearance of action items in the set of possible actions associated with the notification as well as control which applications will be allowed to send notifications to the wearable electronic device.

5. The apparatus of claim 1, wherein the action prioritization routine of the notification managing service is further configured to provide a user interface for the user to drag and drop action items within the set of possible action items of the notification for each application that supplies notifications in order to sequentially arrange the action items to manually set the prioritization order set by the user of the wearable electronic device, where the prioritization order manually set by the user of the wearable electronic device is stored in the memory and then referenced by the action prioritization routine to determine the order of appearance of action items on the display screen.

6. The apparatus of claim 5, wherein the action prioritization routine is configured to select one or more of the prioritized action items based on an available screen space on the wearable electronic device, where a highest rated set of action items are displayed on the display screen of the wearable electronic device without a need to scroll down, where the wearable electronic device has a communication circuit to wirelessly couple to the associated mobile electronic device, and the notification managing service is stored in the memory of the associated mobile electronic device and executed by the processor in the associated mobile electronic device.

7. The apparatus of claim 1, wherein the notification managing service further includes a logging routine to log data, where the logging routine is configured to log action items taken for all received notifications, and thus the logging routine is configured to log action items of the notifications selected by the user of the wearable electronic device and then to store the logged data in the memory of the associated mobile electronic device, where a communication routine of the notification managing service is configured to communicate to a cloud-based server and to regularly transmit the logged data to the cloud-based server and receive back analytics of aggregated logged action items of all users of the first application on their own wearable electronic device;

where the analytics of aggregated logged action items is also weighted into the prioritization order set based on the actual usage pattern of the user the wearable electronic device.

8. The apparatus of claim 7, wherein the cloud-based server is coupled to two or more mobile electronic devices and is configured to communicate with the two or more mobile electronic devices, where the cloud-based server is configured to receive and store the logged data of users of the wearable electronic devices that are associated with the two or more mobile electronic devices in a database associated with the cloud-based server; and wherein an analysis routine of the cloud-based server is configured to analyze, based on aggregated logged action items of all users for notifications from a first application as well as logged action items for notifications for a second application, and then determine the most common action items generally taken by the users with the notification from each particular application.

9. The apparatus of claim 8, wherein a weighting function is configured to execute on the cloud-based server, and to originally determine the list of action items associated with each notification based on
i) the most common action items generally taken by the users based on the aggregated logged action items of all users,
ii) the action items being relevant to the wearable electronic device, and
iii) the action items suggested by the developer of the corresponding application.

10. The apparatus of claim 1, wherein the action prioritization routine also has a user interface configured to allow a user to choose a vibration pattern from a plurality of possible vibration pattern to associate certain vibration patterns with specific applications that generate a notification to the wearable electronic device, where the wearable electronic device is a smart watch.

11. A method of managing notifications for a wearable electronic device, comprising:

configuring an action prioritization routine to receive notifications corresponding to any of a message, an event, and an alert of another application resident in an associated mobile electronic device;

prioritizing two or more action items associated with each active notification by the action prioritization routine, where the prioritization is based on a combination of
i) a first original prioritization order suggested by a developer of a corresponding application,
ii) a second prioritization order manually arranged by a user,
iii) a third prioritization order based on a usage pattern of the user, and
iv) a filter to remove action items when one or more of the set of possible action items is hidden or removed from the set of potential actions that are listed because either that action item is not currently supported by the wearable electronic device or the action item is not deemed relevant for the wearable electronic device;

displaying an active notification and its prioritized action items on a display screen of the wearable electronic device; and sequentially offering the prioritized action items to the user of the wearable electronic device as selectable action items.

12. The method of claim 11, further including:
providing by the notification managing service a first user interface to enable or disable all applications from sending notifications;
providing by the notification managing service a second user interface to enable or disable the applications from sending notifications one by one; and
wherein only the action items associated with the enabled applications are prioritized and are pushed to the wearable electronic device.

13. The method of claim 12, further including:
providing, by the notification managing service, a third user interface for the user to select, for each activate notification, a time period the notification is permitted to be pushed to the wearable electronic device.

14. The method of claim 13, further including:
logging action items of the active notifications selected by the user by the logging routine;
storing the logged data in the memory of the associated mobile electronic device;
regularly communicating the logged data to a cloud-based server,
where the cloud-based server is coupled to two or more mobile electronic devices and is configured to communicate with the mobile electronic devices;
storing the logged actions of all users of the coupled mobile electronic devices in a database associated with the cloud-based server; and
analyzing by an analysis routine of the cloud-based server to determine, based on aggregated logged actions of all users, and then determining the most common action items generally taken by the users with the notification from each particular application.

15. The method of claim 14, further including:
analyzing, by the action prioritization routine of the notification managing service, where the logged data stored in the memory of the mobile electronic device associated with the wearable electronic device to determine, for each active notification, the prioritization order based on the usage pattern of the user of the wearable electronic device.

16. The method of claim 14,
wherein a weighting function is configured to execute on the cloud-based server, and to originally determine the list of action items associated with each notification based on
i) the most common action items generally taken by the users based on the aggregated logged action items of all users,
ii) the action items being relevant to the wearable electronic device, and
iii) the action items suggested by the developer of the corresponding application.

17. The method of claim 11, further including:
restricting by the notification managing service one or more action items associated with an active notification from being prioritized and displayed on the wearable electronic device, either because the action items are not supported by the wearable electronic device or because the action items are not deemed relevant for the wearable electronic device.

18. The method of claim 11, further including:
providing, by the action prioritization routine of the notification managing service, a user interface for the user to drag and drop action items within a set of possible action items of each notification and to sequentially arrange the action items and to manually create the second prioritization order.

19. The method of claim 11, further including:
selecting, by the notification managing service, one or more of the prioritized action items of each active notification based on available screen space on the wearable electronic device, where the selected action items are displayed on the display screen of the wearable electronic device without a need to scroll down.

20. The method of claim 19, further including:
presenting a user interface to allow a user to choose a vibration pattern from a plurality of possible vibration pattern to associate certain vibration patterns with specific applications that generate a notification to the wearable electronic device.

* * * * *